US006058533A

United States Patent [19]

Nelson

[11] Patent Number: 6,058,533

[45] Date of Patent: May 9, 2000

[54] BED APPARATUS

[75] Inventor: Larry A. Nelson, Rte. 5, Box 46A, Winfield, Kans. 67156

[73] Assignee: Larry A. Nelson, Winfield, Kans.

[21] Appl. No.: 09/156,017

[22] Filed: Sep. 17, 1998

[51] Int. Cl.[7] .................................................... A61C 7/005

[52] U.S. Cl. ................................. 5/610; 5/81.1 R; 5/82.1

[58] Field of Search .......................... 5/610, 624, 81.1 R, 5/71.1 C, 83.1, 86.1, 81.1 RP

[56] References Cited

U.S. PATENT DOCUMENTS

| | | | |
|---|---|---|---|
| 942,606 | 12/1909 | Wilson | 5/81.1 C |
| 1,557,662 | 10/1925 | Crawford | 5/610 |
| 3,336,606 | 8/1967 | Beitzel . | |
| 3,609,779 | 10/1971 | Oja et al. . | |
| 3,640,520 | 2/1972 | Wieland et al. . | |
| 3,997,926 | 12/1976 | England | 5/610 |
| 4,016,005 | 4/1977 | DiMatteo . | |
| 4,023,218 | 5/1977 | DiMatteo . | |
| 4,054,959 | 10/1977 | DiMatteo et al. . | |
| 4,190,913 | 3/1980 | DiMatteo et al. . | |
| 4,613,997 | 9/1986 | Langdale . | |
| 4,726,082 | 2/1988 | DiMatteo et al. . | |
| 4,796,313 | 1/1989 | DiMatteo et al. . | |
| 4,797,960 | 1/1989 | Vaiana et al. . | |
| 4,813,088 | 3/1989 | DiMatteo et al. . | |
| 4,819,283 | 4/1989 | DiMatteo et al. . | |
| 4,821,352 | 4/1989 | DiMatteo et al. . | |
| 4,987,622 | 1/1991 | Shockey | 5/86.1 |
| 5,020,171 | 6/1991 | DiMatteo et al. . | |
| 5,127,113 | 7/1992 | DiMatteo et al. . | |
| 5,319,813 | 6/1994 | DiMatteo et al. . | |
| 5,416,939 | 5/1995 | Maalouli . | |
| 5,469,588 | 11/1995 | DiMatteo et al. . | |

*Primary Examiner*—Michael F. Trettel
*Attorney, Agent, or Firm*—Shook, Hardy & Bacon LLP

[57] ABSTRACT

A bed includes a base, a frame supported on the base for relative movement about a horizontal pivot axis between raised and lowered positions, and a drive assembly for driving movement of the frame. The drive assembly includes a drive box supported on the base for pivotal movement about a horizontal axis parallel to the pivot axis of the frame, a motor supported in the drive box, a pair of laterally spaced sleeves supported in the drive box for rotation about horizontal axes that are perpendicular to the pivot axis of the frame, a pair of transmission elements connected between an output shaft of the motor and the sleeves for rotating the sleeves in unison with one another when the motor is operated, and a pair of screws supported in the sleeves for relative rotational movement. The screws each include a distal end that is secured to the frame for pivotal movement about an axis parallel to the pivot axis of the frame such that rotation of the sleeves in a first direction extends the screws, moving the frame toward the lowered, supine position, and rotation of the sleeves in the opposite direction retracts the screws, moving the frame toward the raised upright position. A wheel chair can also be used with the bed for allowing a person to be transferred directly from a seated upright position to the bed. The wheel chair includes a frame presenting wheels and a pair of depending feet that engage a platform of the bed. The platform includes a pair of apertures into which the wheels of the wheel chair drop when the wheel chair is rolled against the raised bed such that the wheel chair remains held against the bed frame as it is moved to the lowered supine position.

18 Claims, 7 Drawing Sheets

BED APPARATUS

CROSS-REFERENCE TO RELATED APPLICATIONS

"Not Applicable".

STATEMENT REGARDING FEDERALLY SPONSORED RESEARCH OR DEVELOPMENT

"Not Applicable".

BACKGROUND OF THE INVENTION

This invention relates generally to beds, and more particularly to a bed that is movable between upright and supine positions in order to facilitate transfer of a person from either a standing or sitting position to a substantially supine position on the bed.

A common problem presented to invalids and aging persons alike is that of climbing into and out of a bed without assistance. As an individual ages and loses his or her flexibility and strength, moving from an upright position to a supine position in a bed and vice versa becomes more and more difficult. As such, there comes a time when assistance is required, forcing such persons and their families to consider the possibility and availability of assisted living arrangements in which such help is provided, frequently by family members or in care facilities. Unfortunately, such assistance can be difficult to provide in the home, and it is often necessary for the person to move into a care facility in order to obtain the equipment and help required. Such a disruption is often difficult for all involved, and is also expensive when compared to the costs incurred by a person remaining at home.

An advantage of care facilities is that they purchase and maintain equipment that assists in the transfer of persons between a standing or sitting position and a laying position on a bed. Typically, such beds include a base supported on the ground and a frame that is movable or foldable between a first position in which the person is leaned or seated against the bed, and a second position in which the person is laid out on the bed. An object of such constructions is to enable this transfer of persons with as little assistance or effort as possible. However, as features are added to the bed to reduce the effort required to make such transfers, the complexity, size and cost of the bed increases, rendering such beds too expensive and cumbersome for home use. Most homes are ill equipped to accommodate such devices, and it is also not economical for most people to consider the purchase of such beds for home use.

BRIEF SUMMARY OF THE INVENTION

It is an object of the present invention to provide a bed apparatus that permits the transfer of a person from either a standing or sitting position to a laying or supine position with minimum effort or assistance, and that is of a relatively simple and inexpensive construction such that the bed is suitable for home use.

It is another object of the invention to provide a bed apparatus that includes a movable frame and mattress, and a economical and reliable drive assembly for driving movement of the frame and mattress between upright and substantially supine positions.

Another object of the invention is to provide a wheel chair having a construction that permits it to be used with the bed apparatus to support a person in an upright sitting position as the person is transferred to and from the bed apparatus.

In accordance with these and other objects evident from the following description of a preferred embodiment of the invention, a bed apparatus is constructed of a base and a frame supported on the base for relative movement about a horizontal pivot axis between raised and lowered positions. A drive box is supported on the base for pivotal movement about an axis that is parallel to the horizontal pivot axis, and a single bi-directional motor is supported in the drive box. A pair of laterally spaced sleeves are supported in the drive box for rotation about horizontal axes that are perpendicular to the pivot axis of the frame, and at least one transmission element is connected between an output shaft of the motor and the sleeves for rotating the sleeves in unison with one another when the motor is operated. A pair of screws are supported in the sleeves for relative rotational movement, and the screws each include a distal end that is secured to the frame for pivotal movement about an axis parallel to the horizontal pivot axis such that rotation of the sleeves in a first direction extends the screws, allowing the frame to move toward the lowered position under the force of gravity, and rotation of the sleeves in the opposite direction retracts the screws, driving movement of the frame toward the raised position.

In accordance with one aspect of the invention, a wheel chair is provided in combination with a bed apparatus, the wheel chair including a frame presenting front and rear ends and including a pair of wheels at the rear end, a pair of wheels at the front end, at least one pair of depending feet positioned between the front and rear ends, and a seat for supporting a person in an upright seated position. The bed apparatus of the combination includes a platform supported on the bed frame at a foot end thereof, and extends generally parallel to the ground in the upright position. The platform includes at least one aperture sized and positioned to align with the rear wheels of the wheel chair when the bed frame is in the upright position and the wheel chair is moved onto the platform against the frame. As such, the rear wheels lower into the aperture and the feet engage the platform when the bed frame is moved toward the supine position, holding the wheel chair against the bed frame.

Another aspect of the invention involves using a wheel chair having a rigid seat back formed of synthetic resin or other suitable material and presenting a pair of laterally spaced sleeves that are sized for receipt on a pair of back support elements of the chair. The sleeves hold the seat back on the chair while allowing the seat back to be lifted from the back support elements to facilitate transfer of a person from the wheel chair to a bed apparatus.

By providing a bed apparatus in accordance with the present invention, numerous advantages are realized. For example, by providing a bed apparatus having a drive assembly including a single motor that rotates a pair of sleeves, and a pair of screws supported in the sleeves for longitudinal shifting movement, a construction results which is reliable and safe. In addition, it is simple to construct, and relatively inexpensive compared to conventional commercial beds.

Further, by providing a bed apparatus and wheel chair that cooperate to transfer a person between an upright, sitting position and a supine position, it is possible for a person to transfer themselves to and from the bed with only minimal assistance, such as that which could be provided by a family member.

BRIEF DESCRIPTION OF THE SEVERAL VIEWS OF THE DRAWING

The preferred embodiment of the present invention is described in detail below with reference to the attached drawing, wherein.

DETAILED DESCRIPTION OF THE INVENTION

Figure 1:
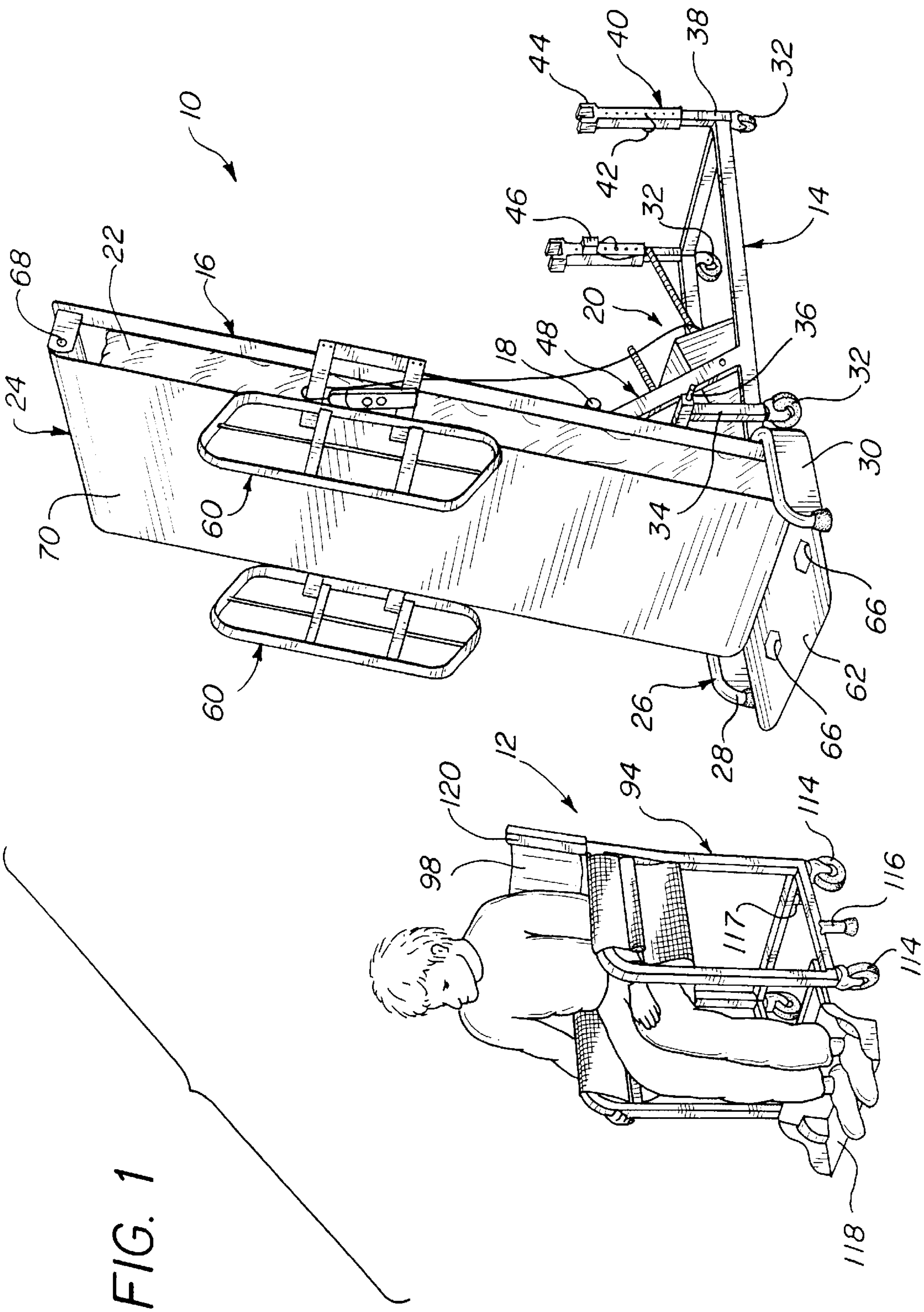
FIG. 1 is a perspective view of a bed and wheel chair constructed in accordance with the preferred embodiment, illustrating the bed in a raised position.

A combination constructed in accordance with the present invention is illustrated in FIG. 1, and broadly includes a bed apparatus 10 and a wheel chair 12 that can either be used individually or together, and that cooperate when used together to facilitate transfer of a person between an upright, sitting position in the wheel chair, and a substantially supine position on the bed.

Figure 2:
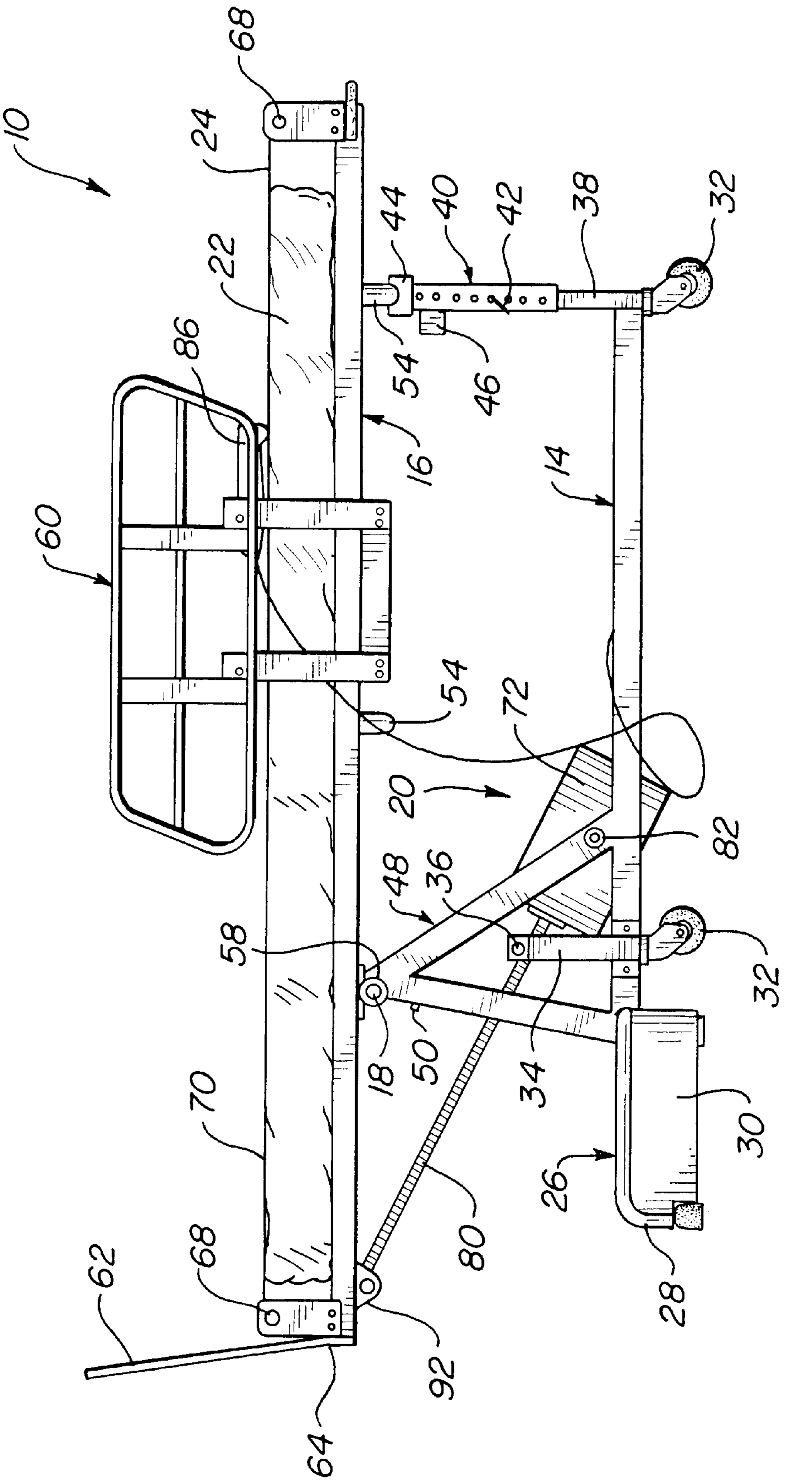
FIG. 2 is a side elevational view of the bed in a lowered position.

The bed apparatus 10 is shown in FIG. 2, and includes a base 14 supported on the ground, a frame 16 supported on the base for relative movement about a shaft 18 defining a horizontal pivot axis between raised and lowered positions, and a drive assembly 20 for so moving the frame. The bed apparatus also includes a mattress 22 and a cover sheet assembly 24 supported on the frame.

As shown in FIG. 1, the base 14 is rectangular in shape, being shorter in length that the frame 16 and including side and end rails that are preferably formed of tubular steel. The base presents head and foot ends, and includes a generally U-shaped foot guard 26 protruding horizontally from the foot end. The guard defines an area adjacent the base within which a foot end of the frame is received when the frame is raised to an upright position as shown in FIG. 1. The guard 26 includes a pair of depending legs 28 provided with rubber covered feet that engage the floor to stabilize the bed during operation. In addition, a piece of sheet metal 30 or the like is fastened to the guard along the sides thereof to prevent anyone from getting a foot pinched between the frame and base when the frame is moved to the raised position.

Four depending wheels 32 are provided on the base at or near the comers thereof, and permit the apparatus to be easily moved. The two wheels on the foot end of the base are supported within a pair of upstanding tubular posts 34 of the base, and are shiftable vertically between a lowered position in engagement with the floor, and a raised position in which the base rests on the legs 28 of the foot guard. By permitting the foot-end wheels to be lifted from the floor in this way, the bed can be supported by the legs which stabilize the bed and prevent it from wiggling during use. As shown in FIG. 2, a rotatable shaft 36 extends between the posts, preferably within a fixed tubular cross member, and is connected through the posts to the foot-end wheels for carrying out lifting and lowering movement of the wheels. A rotatable socket is provided at one or both ends of the shaft 36, and is sized for receiving a crank by which the shaft can be rotated. A cam arrangement extends between the shaft and the wheels to transmit rotational movement of the shaft to the foot-end wheels, although any suitable transmission may be used, e.g. a cable system, a gearing system, or the like.

Returning to FIG. 1, a pair of head-end comer posts 38 are secured to the base at the head end thereof, and present upper ends sized for receipt of tubular sleeves 40. Each comer post includes a hole extending at least partially therethrough, and the sleeves are each provided with a plurality of vertically spaced holes that permit the sleeves to be secured to the posts at various heights. Pins 42 are used to engage the holes and retain the sleeves on the posts, and are easily removable to permit adjustment in the height of the sleeves on the posts. The upper end of each sleeve includes a generally U-shaped cradle 44 formed of metal, a synthetic resin or the like. The cradles are sized and oriented to receive the frame of the bed when the frame is lowered to a supine position, as shown in FIG. 2. As such, vertical adjustment of the sleeves 40 on the comer posts 38 of the base adjusts the angle of the frame in the supine position. In this manner, it is possible to position the person in the bed in a comfortable orientation.

A sensor 46 is supported on one of the sleeves and includes a button or optical sensing element that protrudes or shines into the path of movement of the frame as the frame reaches a position in which it is supported on the cradles of the sleeves. As described below, the sensor 46 forms a part of the drive assembly.

A pair of laterally spaced, longitudinally aligned tubular steel trusses 48 are secured to the side rails of the base, and present collinear, horizontally extending holes at the upper ends thereof within which the shaft 18 is received. A pair of horizontally extending holes are provided in the base adjacent the lower ends of the trusses for defining a second pivot axis that is parallel to the shaft 18. A sensor 50 is supported on one of the trusses and includes a button that protrudes into the path of movement of the frame as the frame reaches the raised, upright position. As described below, the sensor 50 forms a part of the drive assembly.

Figure 4:
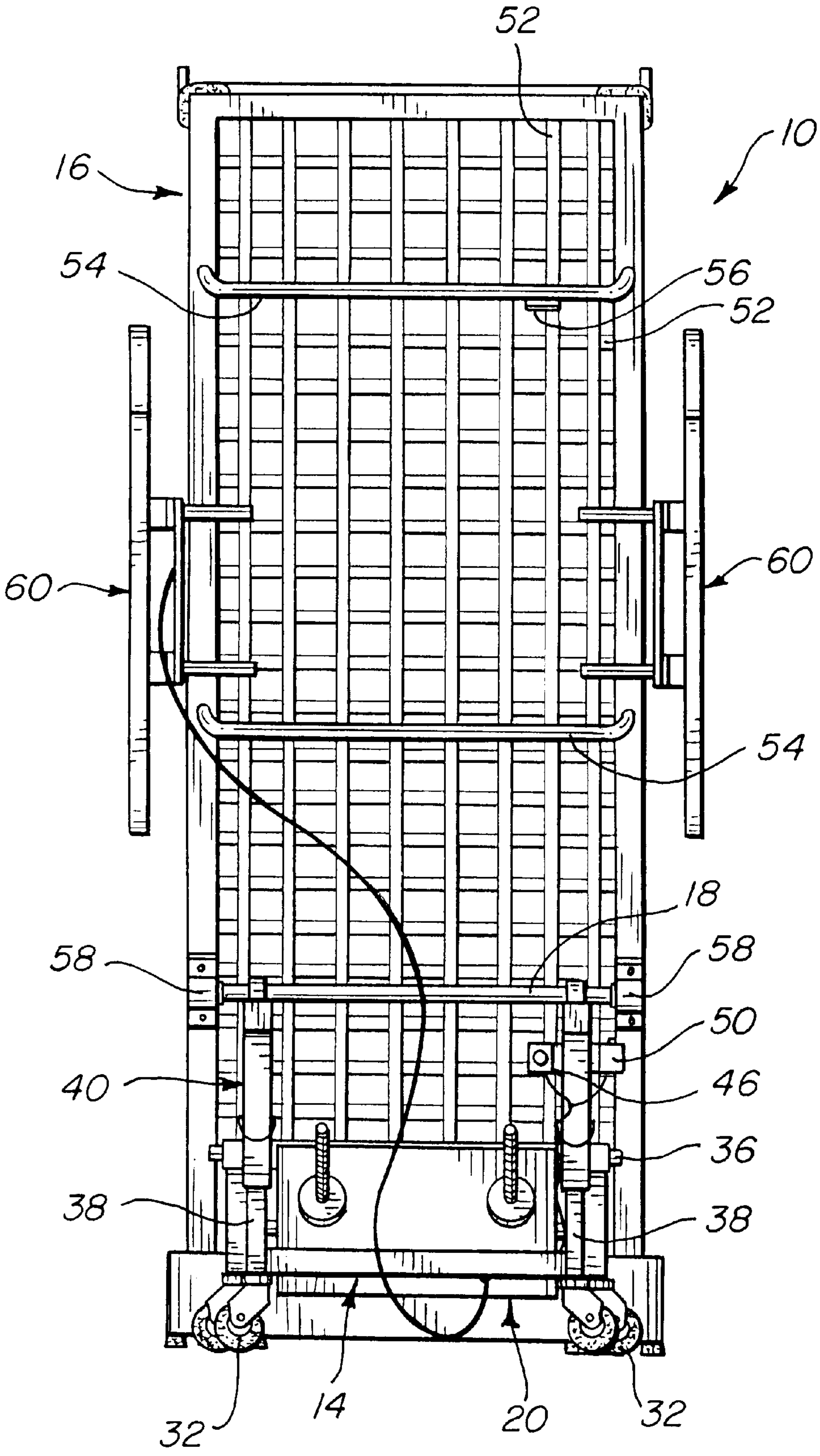
FIG. 4 is a rear elevational view of the bed in the raised position.

With reference to FIG. 4, the frame 16 of the bed apparatus is rectangular in shape, including side and end rails that are preferably formed of L-shaped steel bars that face inward toward one another to define an area sized for receipt of the mattress 22. A plurality of longitudinally and laterally extending strips 52 of metal or synthetic resin span the frame, and each strip is secured to opposing side or end rails by tension springs such that the mattress is supported while the weight of a person on the mattress is accommodated.

Figure 3:
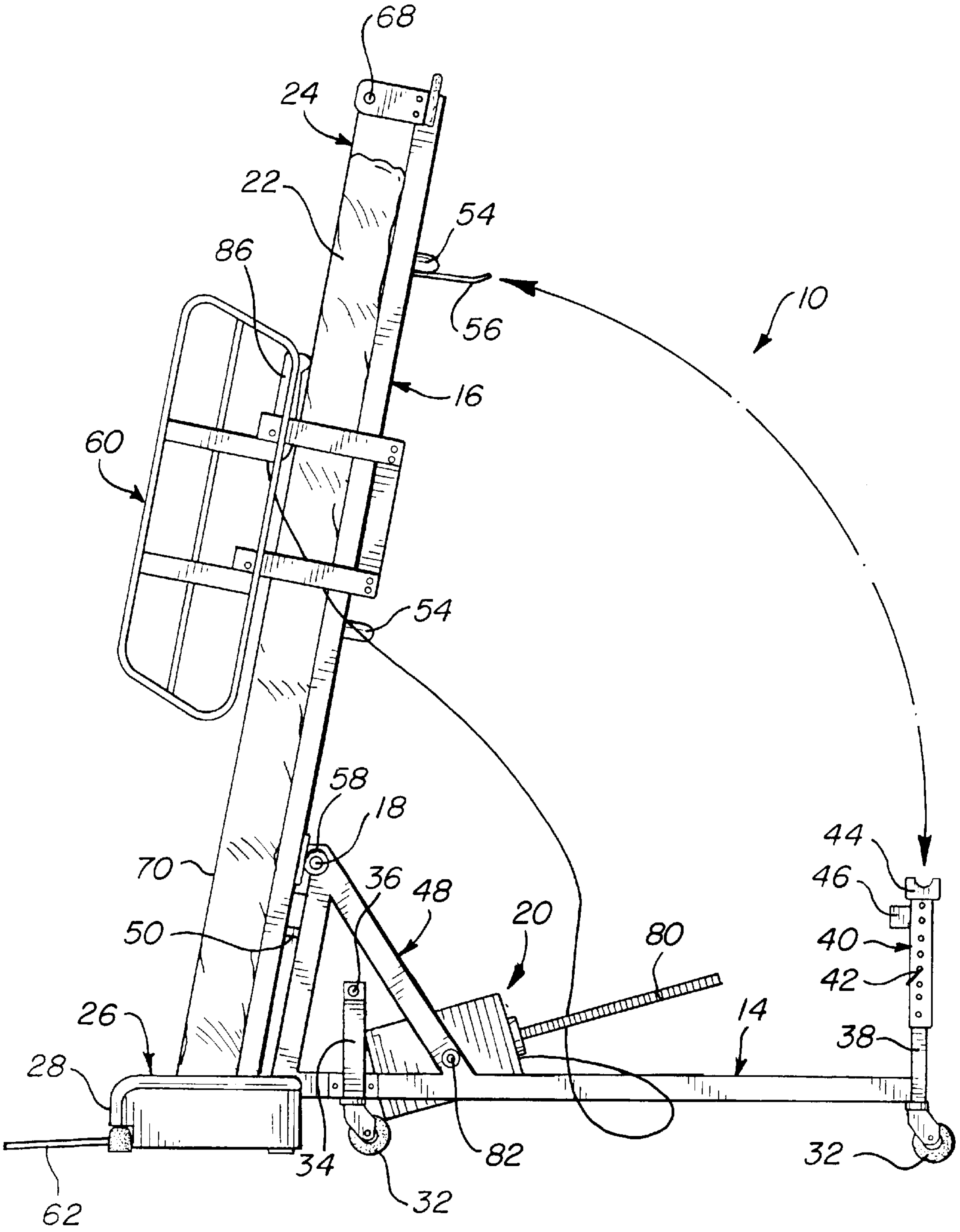
FIG. 3 is a side elevational view of the bed in a raised position.

A pair of longitudinally spaced, laterally extending cross members 54 are secured between the side rails of the frame to add rigidity to the construction, and one of the cross members is positioned to engage the cradles 44 of the base in the lowered position of the frame, as illustrated in FIG. 3, to support the frame on the base. A tongue 56 of metal or the like is secured to the one cross member at a position in which it engages the sensor 46 in the lowered position of the frame.

Returning to FIG. 4, the frame 16 is supported on the shaft 18 by a pair of collars 58 that are fastened to the side rails. The collars are preferably provided with elongated slots through which threaded fasteners are secured to the rails. By providing this construction, the longitudinal position of the collars along the rails can be adjusted, enabling the position of the frame relative to the base and floor to be varied. The collars are received on the shaft for rotation thereon, and the shaft is secured to the base by set screws or the like which permit the shaft to be removed from the apparatus simply by unfastening one of the collars from the frame, sliding the shaft from the collars, and loosening the set screws to allow removal of the shaft from the base. In addition, nylon bearings, bushings or the like are preferably supported in the collars to support the shaft in order to facilitate movement of the bed and reduce wear.

As illustrated in FIG. 1, a pair of hand rails 60 are supported on the side rails of the frame, and are shiftable between a raised position in which they prevent the person in the bed from accidentally rolling onto the floor, and a lowered position enabling the person to swing their legs to the side of the bed to sit up.

A platform 62 protrudes from the foot end of the frame, and is secured to the foot-end rail by a hinge 64, shown in FIG. 2, that permits the platform to pivot about a horizontal axis parallel to the horizontal pivot axis of the frame. A portion of the platform protrudes beyond the hinge and is bent relative to the remainder of the platform to limit pivoting movement of the platform in the counterclockwise direction, as viewed in FIG. 1. As such, the platform 62 is held in an orientation generally perpendicular to the frame. However, during raising of the frame toward the position shown in FIG. 2, the platform is permitted to pivot in the clockwise direction when the platform engages the ground. In addition, in the event that a person's foot is caught between the platform and the floor during raising of the frame, pivoting movement of the platform prevents injury.

The platform 62 is provided to enable a person to be transferred between a standing or upright sitting position and a lying position on the bed, and supports the person while in the upright position. As shown in FIG. 1, the platform includes a pair of laterally spaced apertures 66 sized and positioned to receive the wheel chair, as described below. However, a single aperture of a width equal to that of the wheelchair could also be used.

The mattress 22 is conventional, and includes a cushion or springs for supporting the person in the supine position. The cushion is supported on the frame by its own weight, and can be easily removed for cleaning and the like simply by lifting it from place.

The cover sheet assembly 24 includes a pair of rotatable padded spindles 68 supported at the foot and head ends of the frame, and a cover sheet 70 including opposed axial ends supported on the spindles such that bi-directional rotation of the spindles translates the cover sheet back and forth between the foot and head ends of the frame over the mattress. The spindles 68 each extend through and are supported for rotation by a pair of upstanding arms of the frame, and a socket is provided in at least one end of each spindle for permitting the spindle to be engaged by a crank 69, shown in FIG. 8. Preferably, the same crank is used to rotate the spindles 68 as is used to raise and lower the foot-end wheels of the base, simplifying construction and use of the apparatus. The cover sheet 70 is removable for cleaning, and functions to assist in transfer of a person to and from the bed, and helps to hold the mattress on the frame when the frame is raised.

Figure 5:
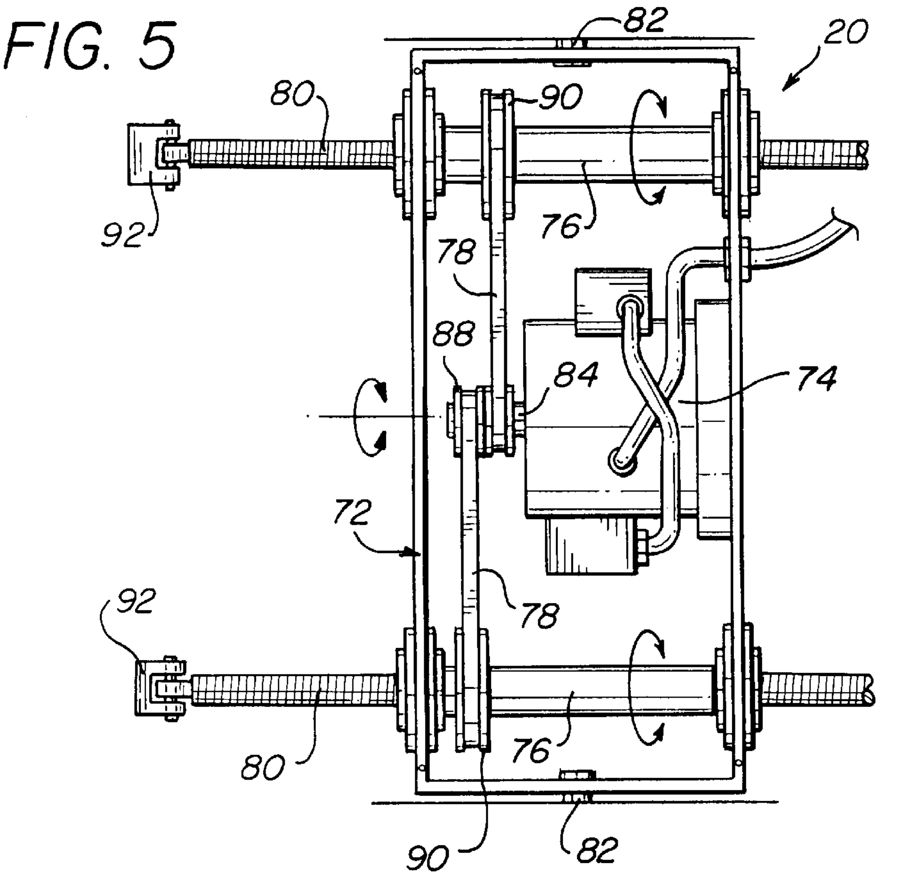
FIG. 5 is a top plan view of a drive box forming a part of the bed.

The drive assembly 20 of the bed apparatus is illustrated in FIG. 5, and broadly includes a drive box 72 supported on the base, a motor 74, a pair of sleeves 76, and at least one transmission element 78 supported in the drive box, and a pair of screws 80 supported between the frame and the sleeves for moving the frame between the raised and lowered positions. The drive box 72 is a six-sided box having bottom and side walls, and a removable top cover. A pair of shaft segments 82 protrude from the lateral side walls of the box and are received in the holes of the trusses such that the drive box is rotatable within the holes about an axis parallel to the horizontal pivot axis of the frame. Preferably, nylon bearings, bushings, or the like support the shaft segments to reduce wear during use. Two pairs of longitudinally extending collinear holes are formed in the front and rear side walls of the drive box and are adapted to accommodate the screws 80.

The motor 74 is secured within the drive box 72 and presents an output shaft 84 that extends in a direction perpendicular to the horizontal pivot axis of the frame. The motor can be driven in either direction, and relays are provided for controlling the direction in response to input signals provided by a hand-held controller. Preferably, the controller includes two buttons, one for rotating the motor in a first direction, and a second for rotating it in the opposite direction. When one of the buttons is depressed, the motor is energized. When the buttons are released, the motor is de-energized. In addition, when one of the sensors is actuated, by the frame engaging the button of one of the sensors, the motor is also de-energized. As such, it is not possible for the motor to continue operating once the frame has reached either the raised or lowered position.

The sleeves 76 of the drive assembly are spaced laterally from one another on opposite sides of the motor 74, and each sleeve is supported in the drive box for rotation about its own longitudinal axis which is oriented perpendicular to the horizontal pivot axis of the frame. Each sleeve includes a threaded or toothed inner surface that engages one of the screws and drives longitudinal shifting movement of the screw relative to the drive box when the sleeve is rotated.

The transmission element 78 of the drive assembly preferably includes a pair of toothed belts, each of which is trained between a drive pulley 88 of the output shaft and a pulley 90 secured to one of the sleeves 76. The drive pulley 88 is secured to the output shaft of the motor for rotation therewith, and includes teeth that mate with the teeth of the belts 78 so that both belts are rotated at the same time and rate as one another. The pulleys 90 on the sleeves 76 are also toothed, and guarantee that the screws are moved at the same rate as one another. Any difference in the position or rate of movement of the screws would result in one side of the frame being offset relative to the other, tilting the mattress to one side. As such, any construction chosen for the transmission element must provide even transmission of rotation to the sleeves.

The screws 80 are not rotatable, but rather are supported between the frame and sleeves in such a way that rotation of the sleeves shifts the screws longitudinally in the sleeves to move the frame between the raised and lowered positions. Each screw includes a foot end that is secured by a bracket 92 to the foot end of the frame such that the screw can pivot relative to the frame about an axis parallel to the horizontal pivot axis of the frame. As such, translational movement of the screws 80 is accommodated both by the pivoting connection of the screws to the frame and the pivoting connection of the drive box to the base. This linkage allows the frame to pivot while maintaining the screws in tension at all times, and enables operation of the bed apparatus without using rotating screws that might otherwise catch on bedding or like, causing damage or injury.

In order to enable a person to be transferred from a standing position to the bed, the controller is actuated, energizing the motor 74 to rotate the sleeves 76 in a first direction. Such rotation of the sleeves shifts the screws 80 longitudinally therein, pulling the frame 16 from the lowered, supine position, shown in FIG. 2, toward the upright position shown in FIG. 1. When the frame reaches the upright position, it engages the button of the sensor 50, de-energizing the motor.

In the raised position of the frame, the platform 62 engages the floor, enabling the person to step onto the platform and actuate the controller to lower the frame. Preferably, the frame is inclined slightly while in the raised position, e.g. 5°–10° from vertical, allowing a person to lean back slightly into the bed before movement of the bed toward the lowered position is started. Such actuation energizes the motor in the opposite direction, rotating the sleeves and shifting the screws 80 to allow the frame to lower under the force of gravity to the supine position. Once the lowered position is reached, the tongue 56 of the frame depresses the button of the sensor 46, de-energizing the motor, as shown in FIG. 3. The person is supported against the frame by the platform during movement and can be shifted toward the head end of the frame, if necessary, by rotating the head-end spindle of the cover sheet assembly 24. Such rotation of the spindle shifts the cover sheet 70, and the person with it, toward the head end of the mattress. Likewise, rotation of the foot-end spindle in the opposite direction shifts the person on the mattress in the opposite direction, toward the foot end of the bed. The bed can then be raised to return the person to the standing position on the platform.

Figure 6:
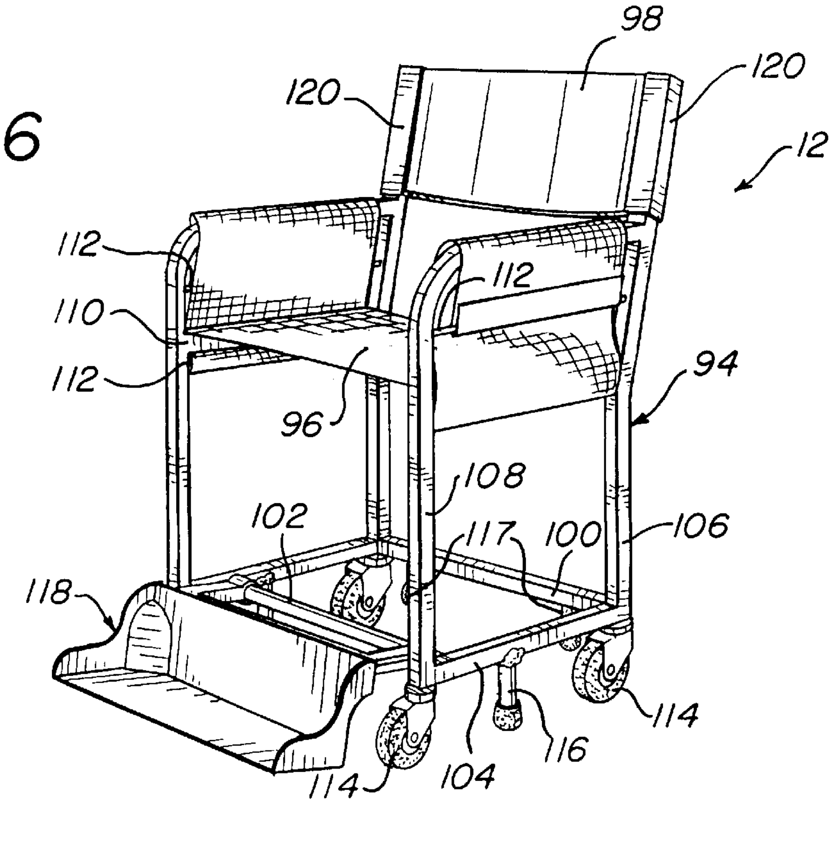
FIG. 6 is a perspective view of the wheel chair.

The wheel chair 12 of the present invention is provided to assist in the transfer of a person between an upright, sitting position and a supine position on the bed. As shown in FIG. 6, the wheel chair broadly includes a frame 94, a seat 96, and a removable back rest 98. The frame 94 is constructed of tubular aluminum steel, and includes a pair of laterally spaced side assemblies that are connected together by upper and lower rear cross members 100 and by a lower front cross member 102 presenting a cylindrical outer surface.

Each side assembly includes a lower rail 104, an upstanding rear post 106, and an upstanding front post 108. The rear post 106 of each side assembly is bent approximately at the center of the height thereof to define a lower half beneath the seat and an upper half protruding above the seat. The front post 108 of each side assembly protrudes above the seat, and is bent at a ninety degree angle toward the rear post of the assembly to define an arm rest the rear end of the arm rest is welded or otherwise secured to the rear post above the seat so that a portion of the rear post protrudes above the arm rest to define a back rest support element. An additional rail 110 is welded between the front and rear posts at a height level with the seat. A pair of spring-loaded seat support rods 112 are also preferably fitted between the front and rear posts. One of the support rods is positioned beneath the frame element and the other is disposed beneath the arm rest of each assembly.

The frame is outfitted with four wheels 114, each of which is disposed at one of the comers of the frame, for allowing the wheel chair to be moved on the floor. In addition, each side assembly of the frame includes a depending foot 116 positioned between the front and rear posts, and the foot is provided with a rubber shoe so that the foot can engage the platform of the bed apparatus during use, as described below. The lower rear cross-member 100 includes a pair of depending feet 117 that are shorter than the feet 116.

A foot rest 118 is supported on the lower front cross member of the frame, and can be pivoted about the cross member between a raised stowed position in which it is tucked beneath the seat, and a lowered use position in which it is disposed in front of the frame for supporting a person's feet while the person sits in the chair.

The seat 96 can be constructed of any desired material, and can either be fixed to the frame 94 or secured in such a way as to be removable. Preferably, the seat is formed of a single piece of cloth that can be easily removed from the frame and cleaned. The cloth presents opposed ends that are hemmed to form sleeves, and the sleeves are received on the upper rods 112 of the frame side assemblies to hold the seat in place. In addition, the cloth is trained over the arm rest and around the lower rod 112 of each side assembly, and spans the frame elements to define the seat. As such, it is possible to remove the seat for cleaning simply by pulling the four rods from the frame and unwrapping the cloth from the chair.

The back rest 98 is formed of any suitable rigid material such as a synthetic resin material or the like, and includes a pair of laterally spaced sleeves 120 that are sized for receipt over the back support elements defined by the rear posts 106 of the frame to hold the seat back on the wheel chair while allowing the seat back to be lifted from the posts to facilitate transfer of a person between the wheel chair and the bed. Preferably, both the support elements and the sleeves present rectangular cross-sectional shapes. However, any desired relationship can exist so long as the back rest can be slid onto and off of the frame with minimal effort.

Figure 7:
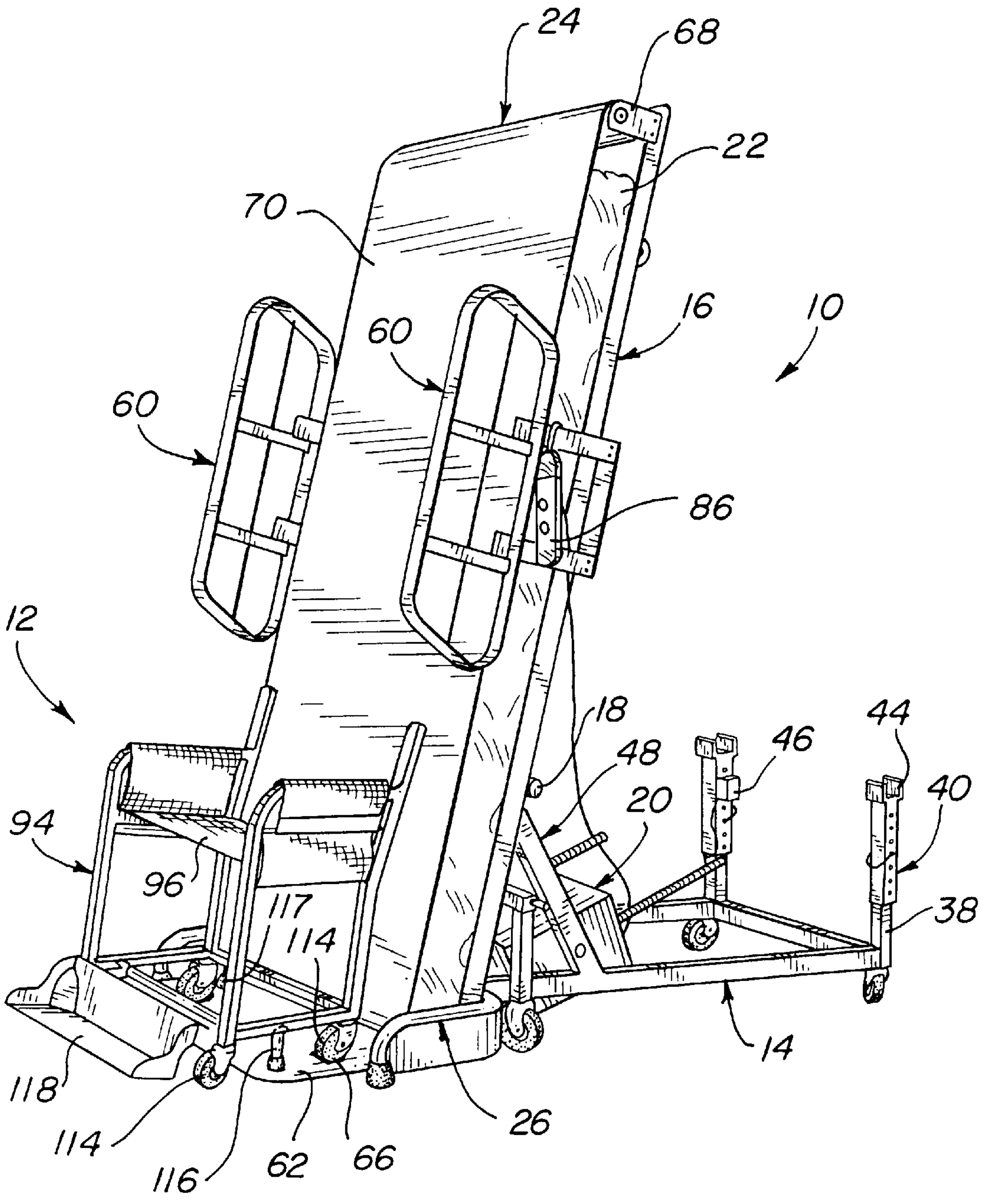
FIG. 7 is a perspective view of the bed and wheel chair, illustrating the manner in which the wheel chair is received on the bed prior to transfer of a person from the wheel chair to the bed.

With reference to FIG. 7, in order to transfer a person from the wheel chair of the preferred embodiment to the bed apparatus, the controller 86 is actuated, energizing the motor of the drive assembly 20 to rotate the sleeves thereof in a first direction. Such rotation of the sleeves shifts the screws 80 longitudinally therein, pulling the frame from the lowered, supine position toward the upright position. When the frame reaches the upright position, it engages the button of the sensor 50, de-energizing the motor, as shown in FIG. 3.

Figure 8:
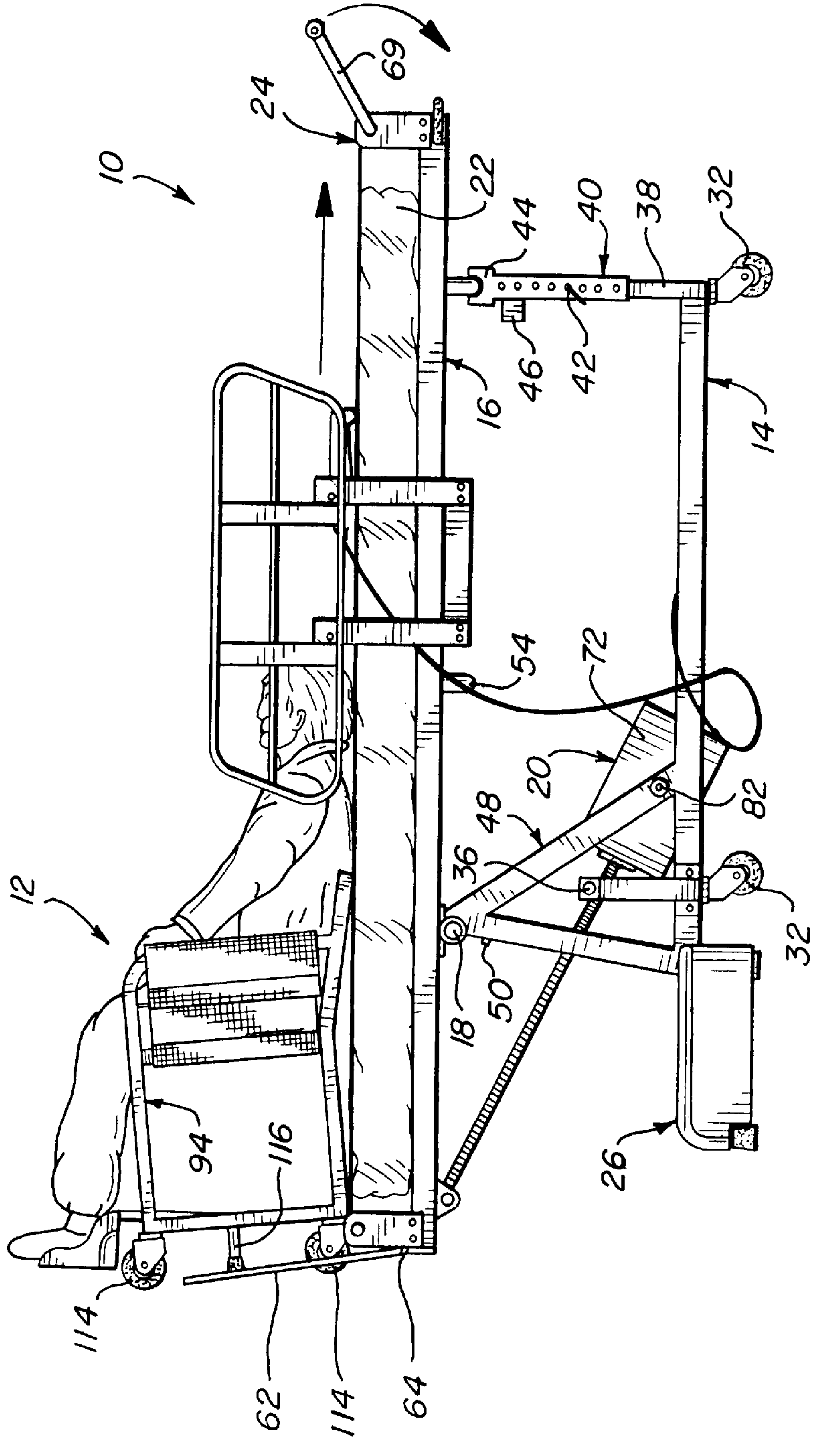
FIG. 8 is a perspective view of the bed and wheel chair, illustrating the manner in which the wheel chair is received on the bed during transfer of a person from the wheel chair to the bed.

In the raised position of the frame, the platform 62 engages the floor, enabling the person to back onto the platform so that the rear wheels of the chair engage the apertures 66 in the platform. The back rest 98 is thereafter removed from the chair so that the person can lean directly against the bed. With reference to FIG. 7, and with the person so positioned, he or she actuates the controller to lower the frame. Such actuation energizes the motor of the drive assembly 20 in the opposite direction, rotating the sleeves thereof and shifting the screws 80 to allow the frame to lower under the force of gravity toward the supine position, as shown in FIG. 8. As this movement is carried out, the rear wheels of the chair 12 drop into the apertures 66 and the feet 116, 117 on the chair engage the platform 62, tilting the chair toward the bed and holding it against the bed during continued lowering. Once the lowered position is reached, the tongue of the frame depresses the button of the sensor 46, de-energizing the motor. The person and chair are then shifted toward the head end of the frame by rotating the head-end spindle of the cover sheet assembly, and the chair is removed. To return the person to the wheel chair, these steps are reversed.

Although the invention has been described with reference to the preferred embodiment illustrated in the attached drawing figures, it is noted that substitutions may be made and equivalents employed herein without departing from the scope of the invention as recited in the claims. For example, although the bed apparatus and wheel chair are disclosed as being useful together in transferring a person between seated and supine positions, it is noted that each can be used independently of the other in that the bed can be used with other types of wheel chairs, and the wheel chair with other types of beds.

What is claimed is:

1. A bed apparatus comprising:

a base;

a frame supported on the base for relative movement about a horizontal pivot axis between raised and lowered positions;

a drive box supported on the base for pivotal movement about a horizontal axis that is parallel to the pivot axis of the frame;

a single bi-directional motor supported in the drive box and presenting an output shaft;

a pair of laterally spaced sleeves supported in the drive box for rotation about horizontal axes that are perpendicular to the pivot axis of the frame;

at least one transmission element connected between the output shaft of the motor and the sleeves for rotating the sleeves in unison with one another when the motor is operated;

a pair of screws supported in the sleeves for relative rotational movement, the screws each including a distal end that is secured to the frame for pivotal movement about an axis parallel to the pivot axis of the frame such that rotation of the sleeves in a first direction extends the screws, moving the frame toward the lowered position, and rotation of the sleeves in the opposite direction retracts the screws, moving the frame toward the raised position.

2. A bed apparatus as recited in claim 1, wherein the at least one transmission element includes a pair of belts, and the output shaft of the motor and the pair of laterally spaced sleeves each include pulleys on which the belts are received.

3. A bed apparatus as recited in claim 2, wherein the belts and pulleys are each provided with teeth such that rotation of the sleeves by the motor is coordinated.

4. A bed apparatus as recited in claim 1, further comprising a control means for controlling operation of the motor, the control means including an input device for activating bi-directional operation of the motor to initiate movement of the frame between the raised and lowered positions, a pair of sensors for detecting the presence of the frame at the raised and lowered positions, and a pair of relays connected to the sensors and to the motor for deactivating the motor when either of the sensors detects the presence of the frame.

5. A bed apparatus as recited in claim 4, wherein one of the sensors is supported on the base adjacent the head end of the frame and is adjustable in height relative to the base to permit adjustment of the lowered position of the frame.

6. A bed apparatus as recited in claim 1, further comprising a platform supported on the frame at the foot end for supporting a person on the bed apparatus during movement of the frame.

7. A bed apparatus as recited in claim 6, wherein the platform is hingedly connected to the frame for pivoting movement about an axis parallel to the horizontal pivot axis of the frame.

8. A bed apparatus as recited in claim 1, further comprising a mattress supported on the frame, a pair of spindles supported at the foot and head ends of the frame, and a cover sheet including opposed axial ends that are adapted to be supported on the spindles such that bi-directional rotation of the spindles translates the cover sheet back and forth between the foot and head ends of the frame over the mattress.

9. A bed apparatus as recited in claim 8, further comprising drive means for driving rotation of the spindles.

10. In combination, a bed and wheel chair for transferring an invalid from an upright seated position on the ground to a substantially supine position on the bed, the combination comprising:

a bed base;

a bed frame presenting foot and head ends and being supported on the bed base for relative movement about a horizontal pivot axis between an upright position in which the foot end is disposed adjacent the ground, and a substantially supine position in which the foot end is spaced from the ground;

a wheel chair frame presenting front and rear ends and including a pair of wheels at the rear end, a pair of wheels at the front end, a pair of depending feet positioned between the front and rear ends, and a seat for supporting a person in an upright seated position; and a bed platform supported on the bed frame at the foot end and extending generally parallel to the ground in the upright position, the platform including at least one aperture sized and positioned to align with the rear wheels of the wheel chair when the bed frame is in the upright position and the wheel chair is moved onto the platform against the frame, the rear wheels lowering into the aperture and the feet engaging the platform when the bed frame is subsequently moved from the upright position to the supine position such that the wheel chair remains held against the bed frame.

11. The combination as recited in claim 10, further comprising:

a drive box supported on the bed base for pivotal movement about a horizontal axis that is parallel to the horizontal pivot axis;

a single bi-directional motor supported in the drive box and presenting an output shaft;

a pair of laterally spaced sleeves supported in the drive box for rotation about horizontal axes that are perpendicular to the horizontal pivot axis;

at least one transmission element connected between the output shaft of the motor and the sleeves for rotating the sleeves in unison with one another when the motor is operated;

a pair of screws supported in the sleeves for relative rotational movement, the screws each including a distal end that is secured to the bed frame for pivotal movement about an axis parallel to the horizontal pivot axis such that rotation of the sleeves in a first direction extends the screws, moving the bed frame toward the supine position, and rotation of the sleeves in the opposite direction retracts the screws, moving the bed frame toward the upright position.

12. The combination as recited in claim 11, wherein the at least one transmission element includes a pair of belts, and the output shaft of the motor and the pair of laterally spaced sleeves each include pulleys on which the belts are received.

13. The combination as recited in claim 12, wherein the belts and pulleys are each provided with teeth such that rotation of the sleeves by the motor is coordinated.

14. The combination as recited in claim 11, further comprising a control means for controlling operation of the motor, the control means including an input device for activating bi-directional operation of the motor to initiate movement of the bed frame between the upright and supine positions, a pair of sensors for detecting the presence of the bed frame at the upright and supine positions, and a pair of relays connected to the sensors and to the motor for deactivating the motor when either of the sensors detects the presence of the bed frame.

15. The combination as recited in claim 14, wherein one of the sensors is supported on the bed base adjacent the head end of the bed frame and is adjustable in height relative to the bed base to permit adjustment of the lowered position of the bed frame.

16. The combination as recited in claim 11, further comprising a mattress supported on the bed frame, a pair of spindles supported at the foot and head ends of the bed frame, and a cover sheet including opposed axial ends that are adapted to be supported on the spindles such that bi-directional rotation of the spindles translates the cover sheet back and forth between the foot and head ends of the bed frame over the mattress.

17. The combination as recited in claim 16, further comprising drive means for driving rotation of the spindles.

18. A bed apparatus as recited in claim 10, wherein the platform is hingedly connected to the bed frame for limited pivoting movement about an axis parallel to the horizontal pivot axis.

* * * * *